3,472,764
SEWAGE TREATMENT METHOD AND PLANT
Gordon L. Culp, Sigurd P. Hansen, John R. Stukenberg, and Robert D. Schilling, Corvallis, Oreg., assignors to Neptune Microfloc, Incorporated, Corvallis, Oreg., a corporation of Oregon
Filed Feb. 5, 1968, Ser. No. 703,110
Int. Cl. C02c 1/06
U.S. Cl. 210—7                           19 Claims

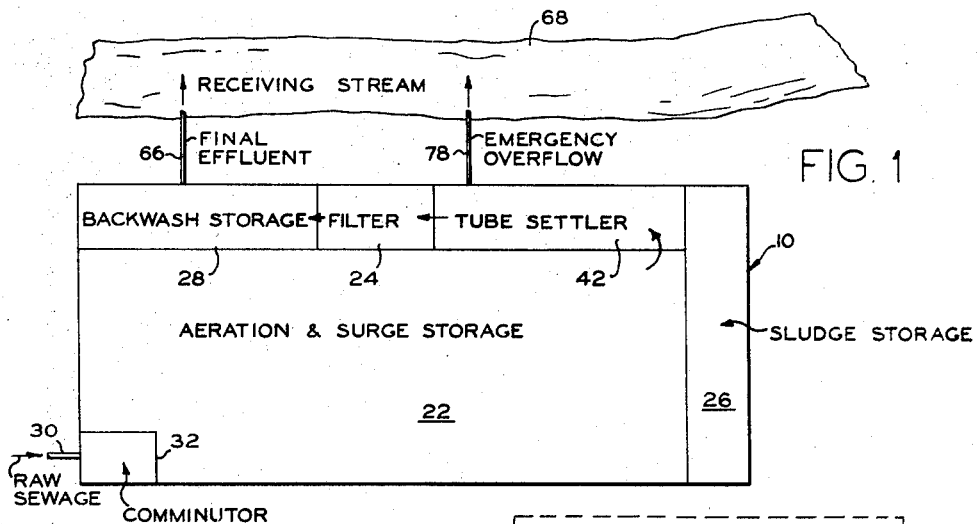
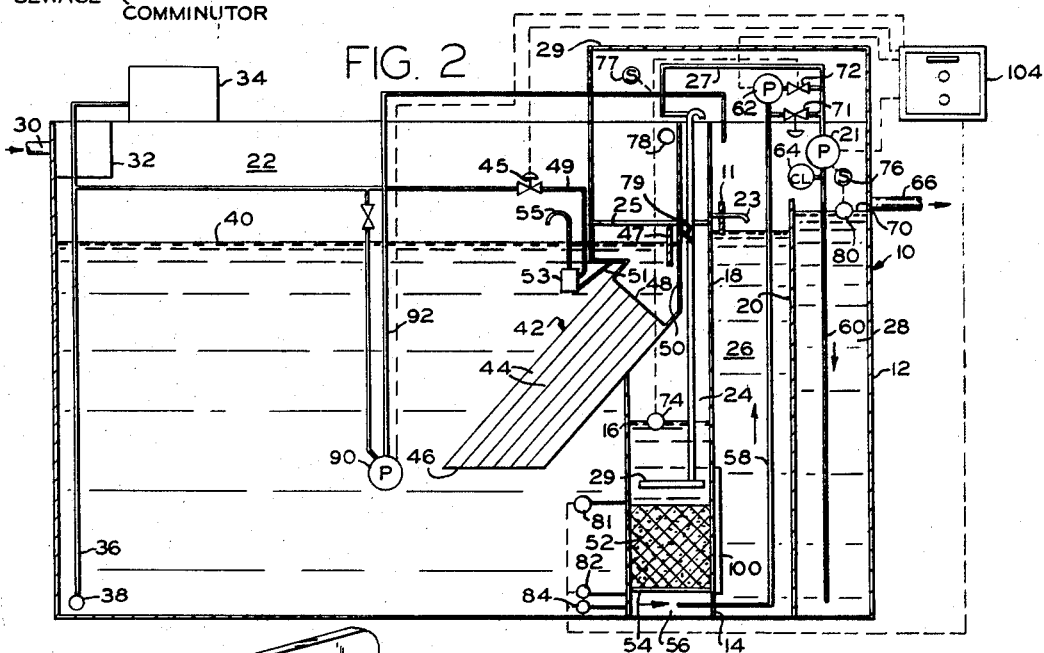
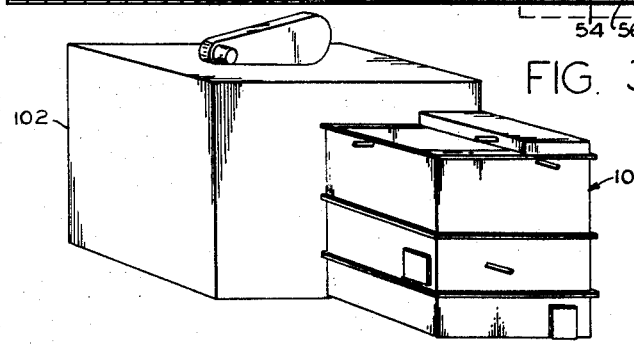

ABSTRACT OF THE DISCLOSURE

A package sewage treatment plant providing both biologic and tertiary treatment within a single container. The container is divided into aeration, filter, backwash storage and sludge storage chambers. After raw sewage is comminuted or screened and aerated in the aeration chamber, it is passed upwardly through inclined settling tubes which settle out solids and return them to the aeration chamber and conduct the liquid effluent into the filter chamber, where the effluent is filtered and then pumped to the backwash storage chamber. The filter is backwashed periodically with the backwash water passing through the sludge storage chamber, resulting in a continuous wasting of sludge to reduce the frequency with which sludge must be manually wasted.

BACKGROUND OF THE INVENTION

Field of the invention

The present invention relates to sewage treatment and more particularly to a process and apparatus for providing both biologic and tertiary treatment of sewage.

Description of the prior art

As population increases and industrial growth continues, control of water pollution demands increasingly high degrees of sewage treatment, to the point where secondary sewage treatment systems are no longer adequate in some instances. Thus tertiary treatment, involving the filtration and in some instances chemical coagulation of effluent from secondary treatment systems, has been added to many existing sewage treatment plants of large capacity. Many smaller sewage treatment plants handling less than 500,000 gallons per day of raw sewage are factory-assembled, so-called package plants incorporating primary and secondary sewage treatment, but not tertiary treatment, within a single prior art container. These small package plants usually serve areas too far from a city to be served by a municipal sewer and are often a significant distance away from a stream of sufficient size to assimilate the occasionally poor quality effluent discharge from such plants. This poor quality effluent results from the discharging of large quantities of solids in the effluent caused by factors such as inadequate operator attention, improper plant operation, surges of raw sewage flow, or mechanical failure of the plant's sludge return system. Such plant upsets are particularly common to small treatment plants. Thus there is a need to improve the operation of small plants to minimize water pollution and to reduce hazards to public health. There is also a need in some areas requiring only small package sewage treatment plants to provide an effluent of higher quality than that provided by secondary sewage treatment processes, even during periods of optimum operation of the secondary plant.

SUMMARY OF THE INVENTION

The present invention overcomes the problems of prior art package plants and meets the needs of areas requiring small plants and a high quality effluent by providing a sewage treatment process and apparatus providing biologic treatment, filtration and chlorination of the effluent if desired within a single integral container or a few separate units of relatively small size as compared to prior package plants providing only secondary sewage treatment.

Principal objects of the invention are to provide:

(1) A package sewage treatment plant of relatively small size;

(2) A sewage treatment plant as aforesaid providing both secondary and tertiary treatment of sewage;

(3) A sewage treatment process and apparatus which combines basic principles of biologic activated sludge treatment, high rate filtration and advanced techniques of solids separation;

(4) An apparatus as aforesaid integrating all of the tankage and equipment requirements for secondary and tertiary sewage treatment within a single compact container;

(5) An apparatus as aforesaid providing within a single container an aeration chamber, a filter chamber, a sludge storage chamber, and a backwash storage chamber;

(6) A process and apparatus as aforesaid providing automatic wasting of solids from the filter backwash to the sludge storage chamber during each backwash cycle so as to reduce to a minimum the frequency with which sludge must be wasted manually from the aeration chamber;

(7) An apparatus as aforesaid providing automatic regulation of the rate of flow of effluent through the filter chamber;

(8) An apparatus as aforesaid providing automatic backwashing of the filter upon predetermined head loss through the filter or, alternatively, upon predetermined turbidity of the filter effluent, whichever occurs first;

(9) An apparatus as aforesaid including an aeration tank also providing surge storage for both raw sewage and backwash water; and

(10) An apparatus as aforesaid which can be constructed, operated and maintained at a minimum cost.

BRIEF DESCRIPTION OF THE DRAWINGS

The foregoing and other objects and advantages of the present invention will become more apparent from the following detailed description which proceeds with reference to the accompanying drawings wherein:

FIG. 1 is a schematic plan view of a sewage treatment plant in accordance with the present invention;

FIG. 2 is a schematic vertical sectional view through a sewage treatment plant in accordance with the present invention on a somewhat larger scale than that of FIG. 1; and FIG. 3 is a perspective view comparing the size of a conventional package treatment plant with a package treatment plant of the subject invention having the same capacity but providing more complete treatment.

DETAILED DESCRIPTION

With reference to the drawings, FIGS. 1 and 2 disclose a package sewage treatment plant in accordance with the invention including an outer rectangular steel container 10 having vertical side walls 12 and a bottom wall 14. The interior of the container is divided vertically by various partitions 16, 18, 20 into an aeration and surge storage chamber 22, a filter chamber 24, a sludge storage chamber 26 and a backwash storage chamber 28. The plant is largely open at its upper end, but the backwash and sludge storage chambers are closed at their upper ends by a top wall 29. Raw sewage enters the container through a raw sewage inlet 30 which leads to a bar screen or comminutor 32 for removing or grinding up large incoming solids. The comminutor or bar screen is mounted within an upper end portion of the aeration chamber, and sewage passing through such device is discharged directly into such chamber. Aeration means within the aeration chamber includes an air compressor 34 which supplies air through a pipe 36 to air diffusers 38 within a lower portion of the chamber below the level 40 of sewage therein. Mechanical surface aeration devices may be used in place of a diffused aeration system with no loss in efficiency.

Solids separating and effluent passage means 42 interconnects the aeration chamber and filter chamber. Such means includes a series of relatively long, narrow tubes 44 inclined upwardly from lower inlet openings 46 within the aeration chamber to upper outlet openings 48. The tubes act to settle out suspended solids from the mixed liquor effluent and pass the mostly clarified effluent into an upper portion of the filter chamber. A weir 50 extending upwardly from the upper end openings of the settling tubes controls the flow of effluent into the filter chamber. The settling tubes are preferably inclined to an angle greater than 45 degrees from the horizontal so that solids settled from the effluent slide by gravity back into the aeration chamber, thereby assuring that the aeration chamber will have sufficient bacterial protoplasm to effect rapid and complete digestion of the raw wastes. A sufficient number of tubes is provided so that at the design capacity of the plant the total cross-sectional area of the tubes sustains streamlined flow through the tubes. This will occur when linear flow rates through the tubes are maintained below about 0.04 foot per second, or about 18 g.p.m./ft.$^2$ of flow rate. The tubes are also designed so as to provide a minimum detention time of solids within the tubes, preferably less than about fifteen minutes. Excessively long detention times above the aforementioned limit could cause septic conditions in the settling basin. This condition is quite common in small conventional plants providing excessive settling basin detention times, and results in sludge floating to the surface and being lost in the plant effluent.

Additional details of construction of the settling tubes are described in prior copending application Ser. No. 649,301, filed June 27, 1967, for Method and Apparatus for Separation of Solids From Liquids.

A filter means 52 extends across the filter chamber below the point of entry of effluent from the tube settling chamber. The filter means is preferably a mixed media filter bed of the type disclosed in copending patent application Ser. No. 478,393, filed Aug. 9, 1965, for Filter and now abandoned, characterized by a uniformly tapering void distribution from coarse to fine in the downward direction of flow. Filter bed 52 may be supported on a perforate underdrain plate 54 spaced above the bottom of the filter chamber so as to define therebeneath a plenum 56. Of course numerous other types of filters and filter underdrain systems could be used, so long as the filter selected produces an effluent meeting the quality standards desired or required.

Filter effluent is pumped from filter plenum 56 by a pump 62 through a suction line 58 and discharge line 60 into the bottom of backwash storage chamber 28. The connection of suction line 58 of the pump to the plenum below the filter bed creates a negative pressure in the plenum which provides a greater effective differential head across the filter than if the elevation head above the filter alone were available. Chlorine from a source 64 is injected into discharge line 60, and the chlorinated filter effluent is retained within the backwash storage tank long enough to provide sufficient chlorine contact for disinfection of the effluent before its discharge from the plant. In most instances, a minimum chlorine contact time of one hour should be provided. The backwash chamber is provided with an overflow outlet pipe 66 which discharges filtered and chlorinated effluent into a receiving stream 68 (FIG. 1) when the effluent rises to a predetermined maximum level 70 within the backwash chamber.

The flow rate of effluent through filter bed 52 is controlled by a float valve 72 in pump discharge line 60 operated by a float, or other sensing means 74 which senses the level of effluent above the filter bed in the filter chamber. An increase in raw sewage flow will eventually result in a rise in the level of liquid above the filter bed which, in turn, causes the float to open wider the float valve 72 to increase the rate of pumping. Conversely, a drop in the level of liquid above the filter bed causes the float to reduce the size of the opening in float 72 to slow down the rate of pumping of filter effluent into the backwash chamber. When the liquid within the filter chamber drops to a predetermined minimum level, float 74 operates a switch 77 which shuts off pump 62. When the incoming flow rate of raw sewage into the aeration chamber exceeds the maximum filter flow rate, the water level in the aeration tank is allowed to increase to provide surge storage of raw sewage. The aeration tank is sized to accommodate surges of raw sewage inflow above the normal rate of flow. The filter chamber is also provided near its upper end with an emergency overflow outlet 78 for discharging aeration chamber effluent upon a rise in the level of such effluent in the filter chamber above the filter bed to an unusual extent, which might be caused, for example, by a temporary breakdown of filter pump 62. In any event, the effluent discharged at this point will have undergone secondary treatment in the aeration basin so that it will have a purity equal to that of effluent normally discharged from conventional package sewage treatment plants, which provide secondary treatment. To provide additional reliability, the emergency overflow can be converted to an emergency storage tank (not shown) of one-half day storage capacity or more to allow repair of any malfunction without discharge of secondary effluent to the receiving stream.

Filter backwashing is accomplished by pumping filter effluent from the backwash tank, 28, with backwash pump 21 through line 60, through valve 71 which automatically opens during backwash, and discharging it into the filter plenum, 56, through line 58. Water is thus pumped from the backwash chamber into the filter plenum 56. Surface wash of the filter is accomplished by diverting a portion of the backwash pump output from line 60 to line 27 to a surface wash system 29.

During backwash, material dislodged from the filter and the backwash water flow into the sludge storage tank 26 through line 23. A valve 79 closes weir 50 at the entrance to the filter chamber during backwash to prevent backwash water from entering the aeration chamber without first passing through the sludge storage chamber. The liquid displaced in the sludge storage chamber is transferred to the aeration tank 22 through a decant line 25. A baffle 11, placed in the sludge storage tank 26, allows only relatively clear liquid to return to the aeration tank 22. It has been found that retention of the solids contained in the backwash water in the sludge tank greatly reduces the frequency with which the plant operator must manually transfer sludge from the aeration tank to the sludge storage tank.

Backwashing of the filter may be initiated periodically on a predetermined time basis or automatically by excessive head loss through the filter as measured by pressure sensors 81, 82, one measuring pressure head above the filter and one pressure head below the filter. Backwashing may also be triggered automatically by excessive filter effluent turbidity as measured by a turbidity sensing meter 84, sensing turbidity within the filter plenum 56. A float 80 senses the level of liquid in backwash chamber 28 and operates switch 76 to shut off pump 21 when the level of water within the backwash chamber drops to a predetermined minimum level during backwash.

During normal operation, grease and other floating solids will accumulate on the water surface above the tube clarifier 42. These solids are prevented from escaping to the filter by a scum baffle 47. When the filter is backwashed, valve 45 in air line 49 opens to activate an air lift pump 53. This pump draws the floating materials through line 51 and discharges them to the aeration tank through line 55. If the airlift pump 53 were allowed to operate continuously, the flow rate through the tube settler 42 would be increased and more tube area at 46 would be needed. Therefore pump 53 is operated only during filter backwash when no flow is passing over weir 50. The rate of pumping of scum by pump 53 has no adverse effect on operation.

An airlift pump 90 within the aeration chamber pumps excess biological sludge from the aeration chamber through a line 92 into sludge storage chamber 26. Pump 90 is activated manually. By observing the concentration of solids in the aeration tank 22, the plant operator may readily determine when it is necessary to waste sludge to sludge tank 26. The continuous wasting of solids by diversion of the filter backwash water into sludge tank 26 greatly reduces the frequency with which the operator must manually activate transfer pump 90. Manual sludge wasting may be needed only once every three months. This long time interval makes the manual wasting of sludge much less critical than with a conventional package sewage treatment plant. All plant controls required for initiating and programming the backwash cycle are mounted in control panel 104.

Example

An example of a typical plant design sufficient to handle 20,000 g.p.d. of raw sewage follows. The overall size of the outer container is 10 feet wide, 25 feet long and 10 feet deep. The aeration chamber has a volume 117 percent of that required to provide twelve hours of aeration during normal raw sewage inflow. The backwash storage chamber has a volume sufficient to store water for two backwashes, and the sludge chamber has a capacity sufficient to store sludge for a period of four to eighteen weeks. The tube settler area is based on a flow rate of 2 g.p.m. per square foot of entrance area 46 at 150 percent of the average design flow. The filter is sized for 5 g.p.m. per square foot at average flow and operates at a variable flow with a maximum rate of 7.5 g.p.m. per square foot. The filter flow rate matches the incoming flow until the latter reaches 150 percent of the design flow rate. A suitable filter composition would include a thirty inch deep mixed media bed composed of three or more materials of different specific gravities and providing a uniformly tapering void distribution from coarse to fine in the downward direction of flow. Particle sizes vary from 0.15 mm. to 1.0 mm. A suitable supporting underdrain plate is made of fused granular aluminum oxide to provide completely uniform backwashing. Gravel underdrain systems may also be used and give satisfactory performance. Filter pump 62 is preferably selected so that its maximum pumping rate corresponds to a filter rate of 10 g.p.m./ft.² or less.

A prototype of a plant as described above, but capable of handling 3,000 g.p.d. of raw sewage, has been producing a filter effluent BOD of about 5 mg./l. and turbidity of less than 5 JU. The plant has consistently provided more than 98 percent removal of BOD and suspended solids found in the raw sewage. MLSS (mixed liquor suspended solids) of 4000–6000 mg./l. have been maintained.

Operation

Summarizing the operation of the aforedescribed package plant, raw sewage enters the container at inlet 30, passes through comminutor 32 and into the aeration chamber where the sewage is subjected to aeration for a period of from ten to twelve hours, thereby receiving long term aerobic biological treatment. Such treatment converts nearly all of the objectionable organic materials in the raw sewage to biologically inert solids, thereby eliminating the need for separate sludge digestion facilities. The aerated sewage passes upwardly through the settling tubes which settle out the mixed liquor-suspended solids and return the solids by gravity to the aeration chamber to maintain adequate biological activity within such chamber to insure a high degree of biological treatment. Thus there is no sludge return pump to fail, as is common in most conventional package plants.

From the settling tubes the liquid effluent passes into the filter chamber and through the filter 52 into plenum 56. Filter effluent is pumped from the plenum into the backwash storage chamber where it is further purified through chlorine contact before passing out of the plant and into the receiving stream through the overflow outlet pipe 66. Backwash pump 21 is initiated automatically upon a sensing of a predetermined head loss by pressure sensors or, alternatively, by a sensing of excessive turbidity in the filter effluent. Backwash water is pumped from the backwash storage chamber upwardly through the filter bed and into the sludge tank from which it overflows to the aeration chamber which, as previously mentioned, is large enough to assimilate the backwash water in addtiion to the continuing inflow of raw sewage. Excess sludge is also transferred manually at infrequent intervals by pump 90 to the sludge tank. Sludge received within the sludge tank is allowed to settle, and the supernatant liquor is returned to the aeration chamber through decant line 25. An access port 100, provided in the lower portion of interior wall 18 of the plant, provides access to the filter, underdrain and liquid above the filter for purposes of maintenance and repair.

The integration of all required tankage within a single container greatly simplifies installation by eliminating much of the plumbing and piping that had to be installed in the field in prior tertiary treatment systems. Only field connection of the inlet, outlet and power is required with the package plant described. Total space requirements are also reduced substantially as will be noted from a comparison in FIG. 3 of the size of the package treatment plant 10 of the subject invention having a 3,000 g.p.d. capacity providing both secondary and tertiary treatment with a conventional 3,000 g.p.d. package plant 102 providing only secondary treatment.

Having described a preferred embodiment of our invention, it should be apparent to those having skill in the art that the same permits of modification in arrangement and detail. We claim as our invention all such modifications as come within the true spirit and scope of the following claims.

We claim:

1. A method of treating sewage comprising:
   continuously feeding to a first chamber and continuously aerating therein raw sewage and continuously separating a major portion of the solid components from the liquid components of the aerated sewage within said first chamber,
   continuously conducting the primarily liquid effluent from said first chamber and passing the same through a bed of filter media,
   backwashing the filter bed at intervals determined either by a predetermined turbidity of the filter effluent or by a predetermined head loss through the filter bed,
   separating from the backwash water the solids therein, and returning the liquid effluent from said backwash to said first chamber.

2. A method according to claim 1 including passing the aerated sewage in said first chamber upwardly through a series of long narrow inclined tubes in a direction toward said filter bed to separate solids therefrom and return the solids to the first chamber.

3. A method according to claim 1 including conducting the filter backwash water to a second chamber during each backwash cycle and separating solids contained in the backwash water from the backwash water in said second chamber.

4. A method according to claim 3 including conducting the backwash water from the second chamber to said first chamber after the withdrawal of solids from the backwash water in said second chamber.

5. A package sewage treatment plant comprising:
    means defining a single container having vertical sidewalls and a bottom wall,
    aeration means within said container for aerating raw sewage entering said container,
    filtering means within said container separated from said aeration means for filtering the effluent from said aeration means,
    means for continuously feeding sewage from said aeration means to said filtering means, including continuously operating sludge separating means within said container for separating solid components from liquid components of the aerated sewage and retaining the solid components within said aerating means,
    backwash means within said container including means for transferring filter effluent between said filter means and a backwash storage chamber,
    and sludge storage means within said container and separated from said aeration means, filter means and backwash means.

6. In a package sewage treatment plant including means defining a container with upright sidewalls and a bottom wall,
    interior wall means dividing the interior of said container vertically into an aeration chamber, a filter chamber, a backwash storage chamber and a sludge storage chamber,
    raw sewage inlet means opening into said aeration chamber,
    final effluent outlet means leading from said backwash storage chamber,
    first passage means interconnecting said aeration chamber and an upper portion of said filter chamber,
    second passage means interconnecting a lower portion of said filter chamber and said backwash storage chamber,
    and third passage means interconnecting said aeration chamber and said sludge storage chamber,
    aeration means for aerating raw sewage entering said aeration chamber,
    filter means within and spaced above the bottom of said filter chamber,
    said first passage means including solids separating means for separating solids from the effluent from said aeration chamber and retaining said solids within said chamber while permitting the passage of said effluent into said filter chamber above said filter means,
    said second passage means communicating with said filter chamber below said filter means and including filter pump means for transferring filter effluent between said backwash storage chamber and said filter chamber,
    and sludge pump means for pumping sludge from said aeration chamber through said third passage means into said sludge storage chamber.

7. Apparatus according to claim 6 wherein said filter means includes an underdrain system spaced above the bottom of said filter chamber, a bed of filter media supported on said underdrain, said bed being composed of at least three intermixed materials of different specific gravities and having a uniformly tapering void distribution from coarse to fine in the downward direction of flow through said bed.

8. Apparatus according to claim 6 including means for chlorinating the effluent from said filter means.

9. Apparatus according to claim 6 wherein said solids separating means includes an inclined settling tube means extending upwardly from said aeration chamber toward said filter chamber, weir means extending upwardly from the upper ends of said settling tube means providing a passage from said tube means into said filter chamber, baffle means at the normal water surface level above said tube means preventing the flow of surface scum over said weir means into said filter chamber, and scum return means bypassing said tube means for returning said surface scum to said aeration chamber, said scum return means being operable intermittently only during the backwashing of said filter means.

10. Apparatus according to claim 6 including means for backwashing said filter means,
    said backwashing means including pump means having a suction passage inlet within said backwash chamber and a discharge outlet within said filter chamber below said filter means,
    sensing means for sensing the filtering effectiveness of said filter means,
    means operatively connecting said sensing means and said pump means for activating said pump means to pump treated effluent from said backwash chamber upwardly through said filter means when said sensing means detects a predetermined minimum effectiveness of said filter means.

11. Apparatus according to claim 10 including
    means for conducting filter backwash from said filter chamber above said filter means to said sludge storage chamber during each backwash cycle for settling out solids from the filter backwash within said sludge chamber.

12. Apparatus according to claim 11 including decant passage means extending between an upper portion of said sludge storage chamber and said aeration chamber for returning supernatant liquor from said sludge storage chamber to said aeration chamber following the transfer of sludge from said aeration chamber to said sludge storage chamber, and following the discharge of filter backwash water in said sludge storage chamber.

13. Apparatus according to claim 11 including means for closing said first passage means between said aeration chamber and said filter chamber during filter backwash.

14. Apparatus according to claim 6 including:
    means adjacent said raw sewage inlet means for limiting the maximum size of solids entering said aeration chamber,
    aerating means within said aeration chamber for aerating said raw sewage,
    said solids separating means comprising a plurality of tubes of small diameter relative to their length extending at an inclination upwardly from said aeration chamber to said filter chamber, and weir means extending upwardly from the upper end of said tubes for conveying the flow of aeration chamber effluent into said filter chamber.

15. Apparatus according to claim 14 wherein the angle of inclination of said tubes from a horizontal plane is greater than forty-five degrees and the total cross-sectional area of said tubes is such that the liquid flow through said tubes will have a Reynolds number less than about 100 at the maximum design flow rate of sewage through said plant.

16. Apparatus according to claim 14 wherein said tubes are sized so that at the maximum design flow rate of sewage through said plant the retention time of sewage within said tubes does not exceed about fifteen minutes.

17. Apparatus according to claim 6 including means for controlling the flow rate of effluent through said filter means comprising:
    flow control valve means in said second passage means,
    sensing means for sensing the level of liquid within said filter chamber above said filter means,
    and control means operable in response to sensings of said sensing means to incerase the opening of said valve means and thereby increase the flow rate through said filter means upon a rise in the level of liquid above said filter means, to decrease the opening of said valve means upon a fall of said level and thereby reduce said flow rate, and to shut off said pump means upon a fall in said level below a predetermined minimum.

18. Apparatus according to claim 17 including emergency overflow outlet means in an upper portion of said filter chamber for temporarily discharging aerated and settled but unfiltered effluent from said container upon temporary failure of said filter pump means.

19. A sewage treatment device comprising a container having vertical walls and a bottom,
   a plurality of vertical partitions in said container defining with each other and the container walls an aeration chamber, a filter chamber, a sludge storage chamber and a backwash storage chamber,
   means for continuously introducing raw sewage to said aeration chamber,
   aeration means for introducing air into said aeration chamber,
   a perforated plate spaced above the bottom of said filter chamber and extending across said chamber,
   a bed of filter media positioned upon said plate,
   solids separating means for separating solids from the eration chamber effluent and conducting said effluent from said aeration chamber to said filter chamber above said media comprising a plurality of tubes extending from said aeration chamber into said filter chamber, said tubes being of small diameter relative to their length and being inclined upwardly from said aeration chamber to said filter chamber at an angle greater than forty-five degrees to the horizontal, the total cross-sectional area of said tubes being such that at the maximum design flow rate of sewage through the device the liquid flow through such tubes will have a Reynolds number less than about 100,
   filter and backwash pump means communicating with said storage tank and said filter chamber beneath said plate for pumping water between the bottom of said filter chamber and said storage tank,
   sludge pump means for pumping sludge from said aeration chamber to said sludge holding chamber,
   level sensing means for sensing the level of liquid within said filter chamber above said media,
   means responsive to said level sensing means to effect an increase in flow rate between said filter chamber and said backwash pump means to pump water from said storage tank chamber upon an increase in said level and to effect a decrease in said flow rate upon a decrease in said level,
   filter sensing means for sensing the effectiveness of said filter media,
   means responsive to said filter sensing means for causing said filter pump means to pump water from said backwash chamber to the bottom of said filter chamber upon a predetermined sensing of said filter sensing means,
   said sludge wasting control means including means for conducting filter backwash water through said sludge storage chamber.

References Cited
UNITED STATES PATENTS

| | | | |
|---|---|---|---|
| 3,206,032 | 9/1965 | Nottingham et al. | 210—195 |
| 3,327,855 | 6/1967 | Watson et al. | 210—220 X |

MICHAEL E. ROGERS, Primary Examiner

U.S. Cl. X.R.
210—8, 13, 108, 195, 259